(12) United States Patent
Nedwell

(10) Patent No.: US 6,434,085 B1
(45) Date of Patent: Aug. 13, 2002

(54) DISTANCE MEASURING SYSTEMS ALTIMETERS AND AIRCRAFT

(75) Inventor: Jeremy Ross Nedwell, Soberton Heath (GB)

(73) Assignee: Subacoustech Limited, Hampshire (GB)

( * ) Notice: Subject to any disclaimer, the term of this patent is extended or adjusted under 35 U.S.C. 154(b) by 0 days.

(21) Appl. No.: 09/343,123

(22) Filed: Jun. 25, 1999

(30) Foreign Application Priority Data

Jun. 30, 1998 (GB) .............................................. 9814024

(51) Int. Cl.⁷ .............................................. G01S 15/08
(52) U.S. Cl. ........................... 367/100; 367/99; 367/101
(58) Field of Search .......................... 367/99, 100, 101, 367/87

(56) References Cited

U.S. PATENT DOCUMENTS

| | | | |
|---|---|---|---|
| 4,739,860 A | * | 4/1988 | Kobayashi et al. ............ 367/99 |
| 4,979,154 A | | 12/1990 | Brodeur ....................... 367/116 |
| 5,128,961 A | * | 7/1992 | Ueda et al. ..................... 375/1 |
| 5,173,881 A | | 12/1992 | Sindle ......................... 367/100 |
| 5,206,652 A | * | 4/1993 | Hoyt et al. .................... 367/99 |
| 5,417,114 A | * | 5/1995 | Wadaka et al. ............. 367/100 |
| RE35,607 E | * | 9/1997 | Nagamune et al. ........... 367/99 |

FOREIGN PATENT DOCUMENTS

| | | |
|---|---|---|
| JP | 55131787 | 10/1980 |
| JP | 05027031 | 2/1993 |
| WO | WO81/00456 | 2/1981 |

* cited by examiner

Primary Examiner—Ian J. Lobo
(74) Attorney, Agent, or Firm—Sheridan Ross P.C.

(57) ABSTRACT

A distance measuring system is described which may be used as an altimeter for a helicopter or for a load carried by its winch. The system comprises: a transmitting transducer for converting a first modulated electrical signal into a corresponding acoustic signal to be directed towards and reflected by a surface; a receiving transducer for converting the received reflected acoustic signal into a corresponding second electrical signal; and a correlation processor for receiving the second electrical signal, or the first and second electrical signals, and correlating the modulations thereof to produce an indication of a time delay thereof from which the distance travelled by the acoustic signal can be determined. The frequency of the acoustic signal is preferably chosen so that it is not at or near the fundamental resonant frequency of either transducer and so that it satisfies at least one of the following conditions: at or near a higher-order resonant frequency of one or both of the transducers; at a frequency at which a frequency-dependent directivity index of the transducers is relatively high; at a frequency at which the ambient acoustic noise level is relatively low; and at a frequency at which the acoustic reflection loss at the surface is relatively low.

4 Claims, 8 Drawing Sheets

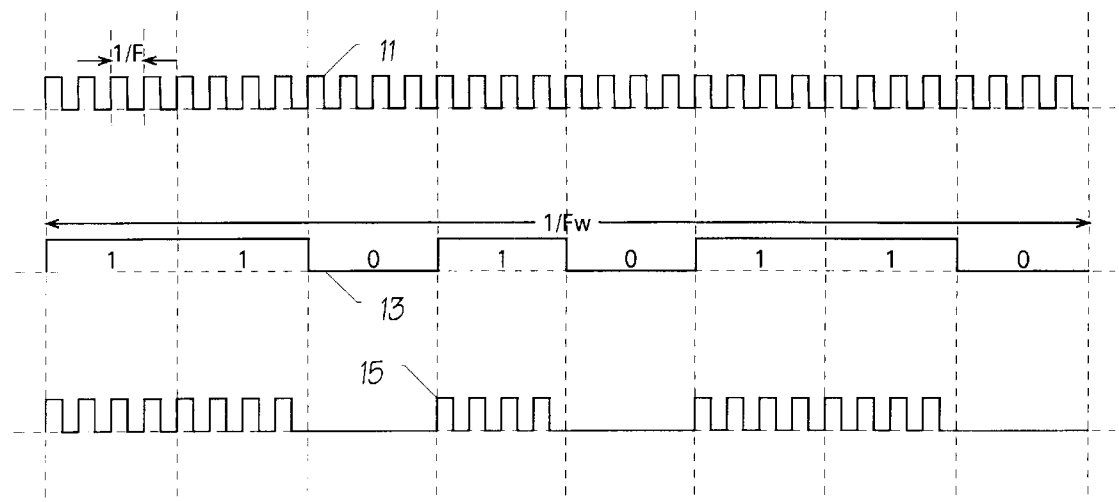
FIG. 2
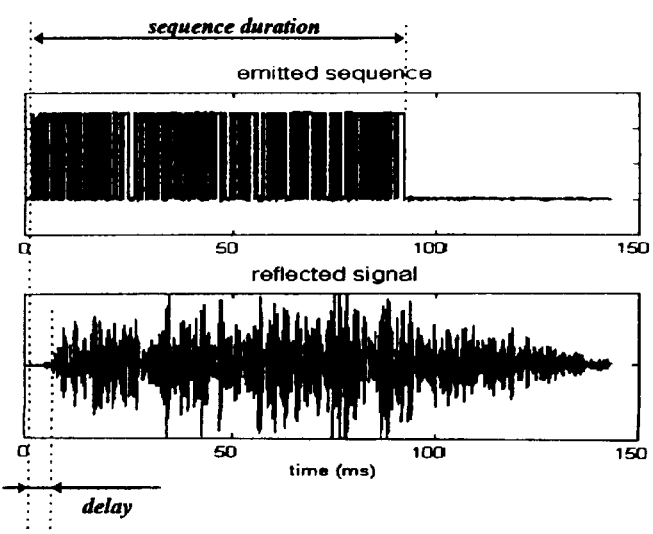
FIG. 3A
FIG. 3B

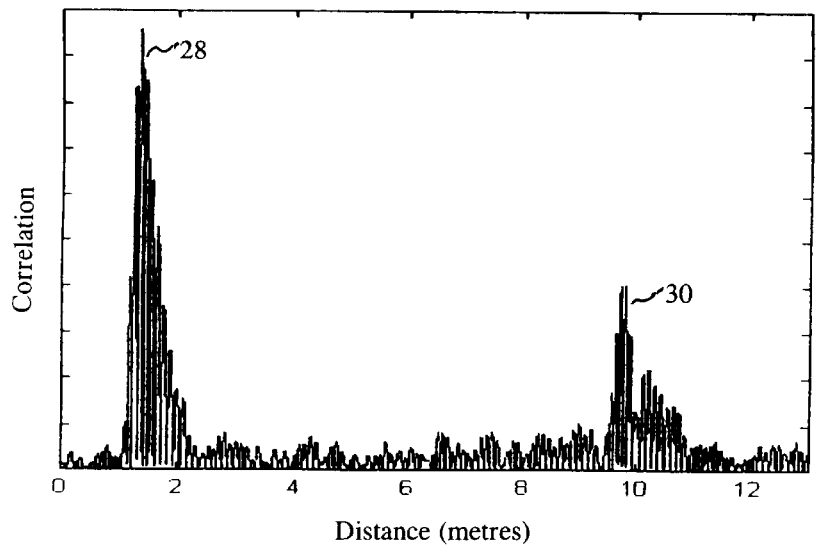
FIG. 4
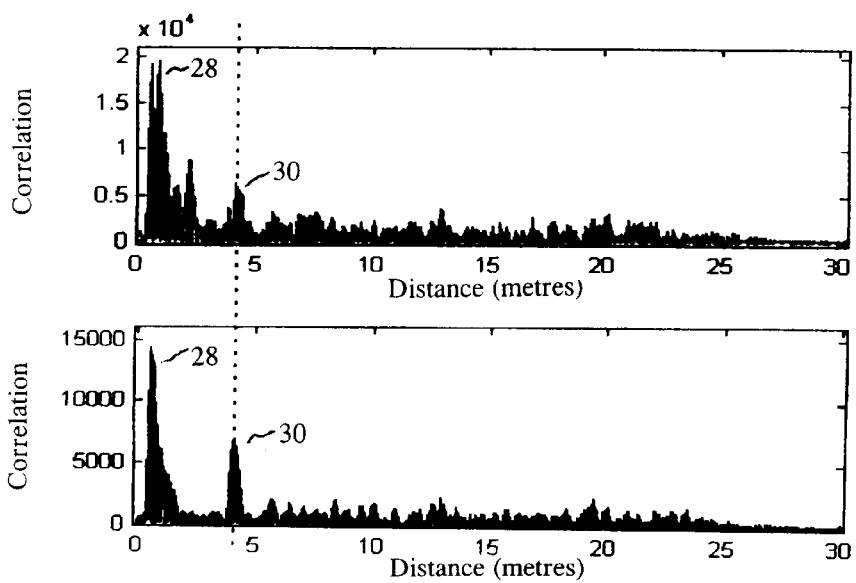
FIG. 5A
FIG. 5B

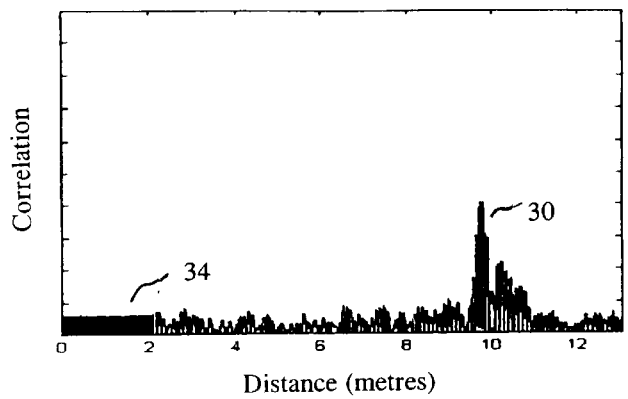
FIG. 6
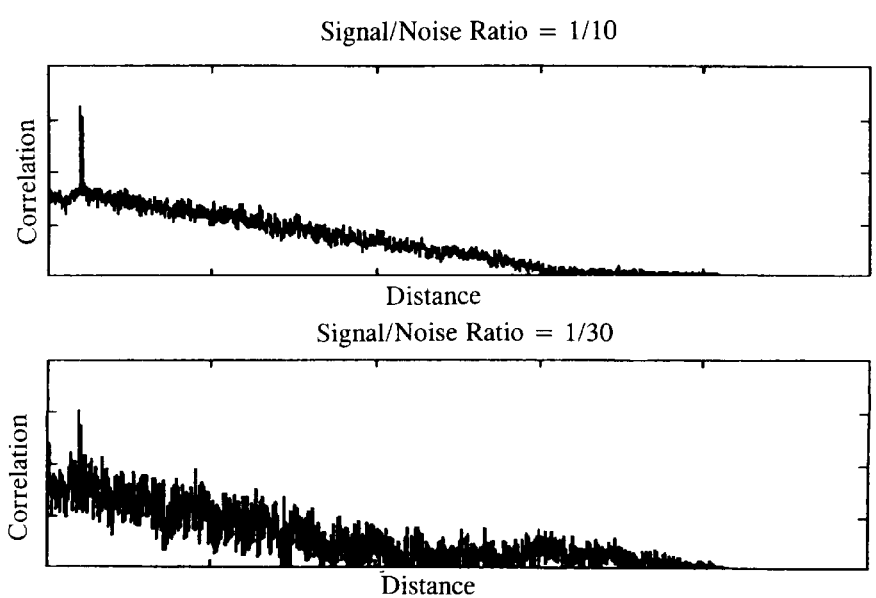
FIG. 7A
FIG. 7B

DISTANCE MEASURING SYSTEMS ALTIMETERS AND AIRCRAFT

BACKGROUND TO THE INVENTION

1. Field of the Invention

This invention relates to distance measuring systems, and in particular, but not exclusively, to the use of such systems as altimeters, and in particular, but not exclusively, to the use of such altimeters with aircraft such as helicopters and balloons.

More particularly, the distance measuring systems of the present invention are of the type comprising: means for generating a first modulated electrical signal; a transmitting transducer for receiving the first electrical signal and producing a corresponding modulated acoustic signal to be directed towards and reflected by a surface; a receiving transducer arranged to receive the reflected acoustic signal and for producing a corresponding second modulated electrical signal; and processing means for receiving the second electrical signal, or the first and second electrical signals, and correlating the modulations thereof to produce an indication of a time delay thereof from which a distance travelled by the acoustic signal can be determined. From the time delay and the local speed of sound, the distance can, of course, then be determined.

2. Description of the Prior Art

Distance measuring systems of this type are already known, from patent document U.S. Pat. No. 5,173,881 in the context of vehicle proximity sensing, and from patent document WO-A-81/00456 in the context of geological prospecting.

In such systems, it would generally be desirable to used matched transducers for transmitting and receiving. Indeed, due to the reciprocity of typical transducers suitable for this purpose, it is generally desirable for the two transducers to be identical. Furthermore, it would generally seem to be desirable to operate the transducers at their fundamental resonant frequency so that the acoustic signal is as strong as possible.

SUMMARY OF THE INVENTION

In accordance with a first aspect the present invention, however, the frequency of the acoustic signal is chosen so that it is not at or near the fundamental resonant frequency of either transducer and so that it satisfies at least one (preferably two or more, and more preferably all) of the following conditions: (i) at or near a higher-order resonant frequency of one or both of the transducers; (ii) at a frequency at which a frequency-dependent directivity index of the transducers is relatively high; (iii) at a frequency at which the ambient acoustic noise level is relatively low; and (iv) at a frequency at which the acoustic reflection loss at the surface is relatively low. As will be appreciated from the following detailed description, this increases the maximum operating range of the system.

A problem which arises in the system of the known type is related to airborne transmission directly between the transmitting transducer and the receiving transducer, rather than via the reflective surface. Typically, direct airborne transmission would produce a greater peak in the correlation than the reflected transmission. In order to deal this problem, the transducers may be spaced further apart. However, the system then becomes less compact. In accordance with a second aspect the present invention, the transmitting and receiving transducers are mounted adjacent each other, and an acoustically absorbent material is mounted between the transmitting and receiving transducers. It has been found that the addition of the acoustically absorbent material not only reduces the direct airborne transmission peak in the correlation, but may also increase and sharpen the reflected transmission peak, and thus it becomes easier to extract the required information in the correlation process.

Even when the second aspect of the invention is employed, it may be the case that the direct airborne transmission peak is greater than the reflected transmission peak in the correlation. In order to deal this problem, in accordance with a third aspect of the present invention, the processing means does not attempt to correlate the first and second electrical signals in respect of a time delay which is less than or generally equal to the time taken for the acoustic signal to travel directly from the transmitting transducer to the receiving transducer. It will be appreciated that this may then reduce the minimum operating range of the system. However, by placing the transducers sufficiently close to each other, for many applications of the system this may not be an issue. It should also be noted that, by employing the second and third aspects of the invention in combination, not only are the effects of direct airborne transmission substantially cancelled out in the correlation, but also the reflected transmission peak may be unexpectedly increased and sharpened, as mentioned above.

For compactness and simplicity, the transmitting and receiving transducers are preferably disposed adjacent each other and provided on a common mounting. However, a problem then arises that mechanical vibrations can be transmitted through the common mounting from the transmitting transducer to the receiving transducer, which may produce sufficient noise to obliterate completely the reflection peak in the correlation. In order to deal with this problem, in accordance with a fourth aspect of the present invention, the transmitting and receiving transducers are mounted adjacent each other, each by a respective mounting system to a common member, and at least one of the mounting systems provides acoustic damping and isolation between the respective transducer and the common member.

In accordance with a fifth aspect the present invention, the first electrical signal is either a carrier wave (such as a sine wave) which is modulated by a random or pseudorandom binary sequence (preferably an M-sequence), or is the binary sequence itself. Pseudo-random binary sequences include sequences which repeat after a finite period. Particularly good results are achieved with repetitive sequences which comprise all binary words that can be made from n binary digits, where n is an integer which can have a value of from one upwards. If the all-zero case is excluded, the sequence is termed a maximal length sequence or M-sequence.

As mentioned above, the distance measuring system may be used with an aircraft, such as a helicopter or balloon, as an altimeter or for obstacle detection.

In particular, in the case of the system of the first aspect of the invention when used with a helicopter, the frequency of the acoustic signal is preferably chosen so that it satisfies at least one of the following conditions: (i) at a frequency at which the acoustic noise level produced by the helicopter below the helicopter is relatively low; and (ii) at a frequency at which the acoustic reflection loss at an interface between air and for example grassland, rock or water is relatively low.

At least one of the transducers may be stationarily mounted with respect to the body of the helicopter. If both transducers are so mounted, the system can be used to measure the altitude of the aircraft above ground or sea level. Additionally or alternatively, at least one of the transducers may be stationarily mounted with respect to a winch-hook, or the like, of the aircraft. If both transducers are so mounted, the system can be used to measure the altitude of the winch load above ground or sea level. If one of the transducers is mounted on the aircraft and the other on the winch-hook, the altitude of the winch hook can still be measured by correlating the modulations of the directly received acoustic signal and the reflected acoustic signal.

In accordance with a sixth aspect of the present invention, there is provided an aircraft having a distance measuring system of the type mentioned previously, and further including means for controlling an altitude-related aspect of the aircraft in dependence upon the indicated time delay. For example, the lift produced by the aircraft may be controlled in dependence upon the indicated time delay so as to control the aircraft altitude above ground or sea level. Additionally or alternatively, the length of a winch line of the aircraft may be controlled in dependence upon the indicated time delay so as to control the height of the load above ground or sea level, regardless (within limits) of the aircraft altitude. With appropriate control in dependence upon the time delay, "soft landing" of loads can be readily and reliably achieved.

It is not necessary, in all applications, to employ a transducer to produce a modulated acoustic signal which is directed towards and reflected by the surface. Instead, in the case of an aircraft, it is possible to use noise normally generated by the aircraft, such as by the tips of the rotor of a helicopter, by the aircraft's engine, by airflow over the aircraft's fuselage, etc. Accordingly, in accordance with a seventh aspect of the invention, there is provided an aircraft having a distance measuring system comprising: receiving transducer means arranged to receive a modulated acoustic signal generated by the aircraft, both directly and indirectly after reflection by a surface, and to produce a corresponding modulated electrical signal; and processing means for receiving the electrical signal and correlating the modulations thereof to produce an indication of a time delay thereof from which a distance travelled by the reflected acoustic signal can be determined. Preferably, the receiving transducer means comprises a directional transducer which is directed towards the surface so as to enhance the proportion of the sound received from the surface. Also, the receiving tranducer means preferably further comprises a second directional transducer which is directed towards the source of the acoustic signal generated by the aircraft to produce a further electrical signal, the processing means being operable to correlate the modulations of both of the electrical signals.

It should be noted that any of the features of the various aspects of the invention set out above may be may be combined in any combination in a single system.

BRIEF DESCRIPTION OF THE DRAWINGS

A specific embodiment of the present invention will now be described, purely by way of example, with reference to the accompanying drawings, in which:

FIG. 2 is a trace of signals against time to illustrate how a signal transmitted by the system of FIG. 1 can be generated;

FIGS. 3A and 3B are traces of signal level against time for a transmitted signal and a received signal, respectively, in a basic form of the system of FIG. 1;

FIG. 4 is a trace of correlation against distance for the two signals of FIGS. 3A and 3B;

FIGS. 5A and 5B are traces of correlation against distance for two signals like those of FIGS. 3A and 3B without and with, respectively, acoustic isolation of the transmitting and receiving transducers;

FIG. 6 is a similar trace of correlation against distance, but showing the effect cancelling the initial correlation data;

FIGS. 7A and 7B are traces of correlation against distance without and with, respectively, additional white noise added;

DETAILED DESCRIPTION OF THE PREFERRED EMBODIMENT

Figure 1:
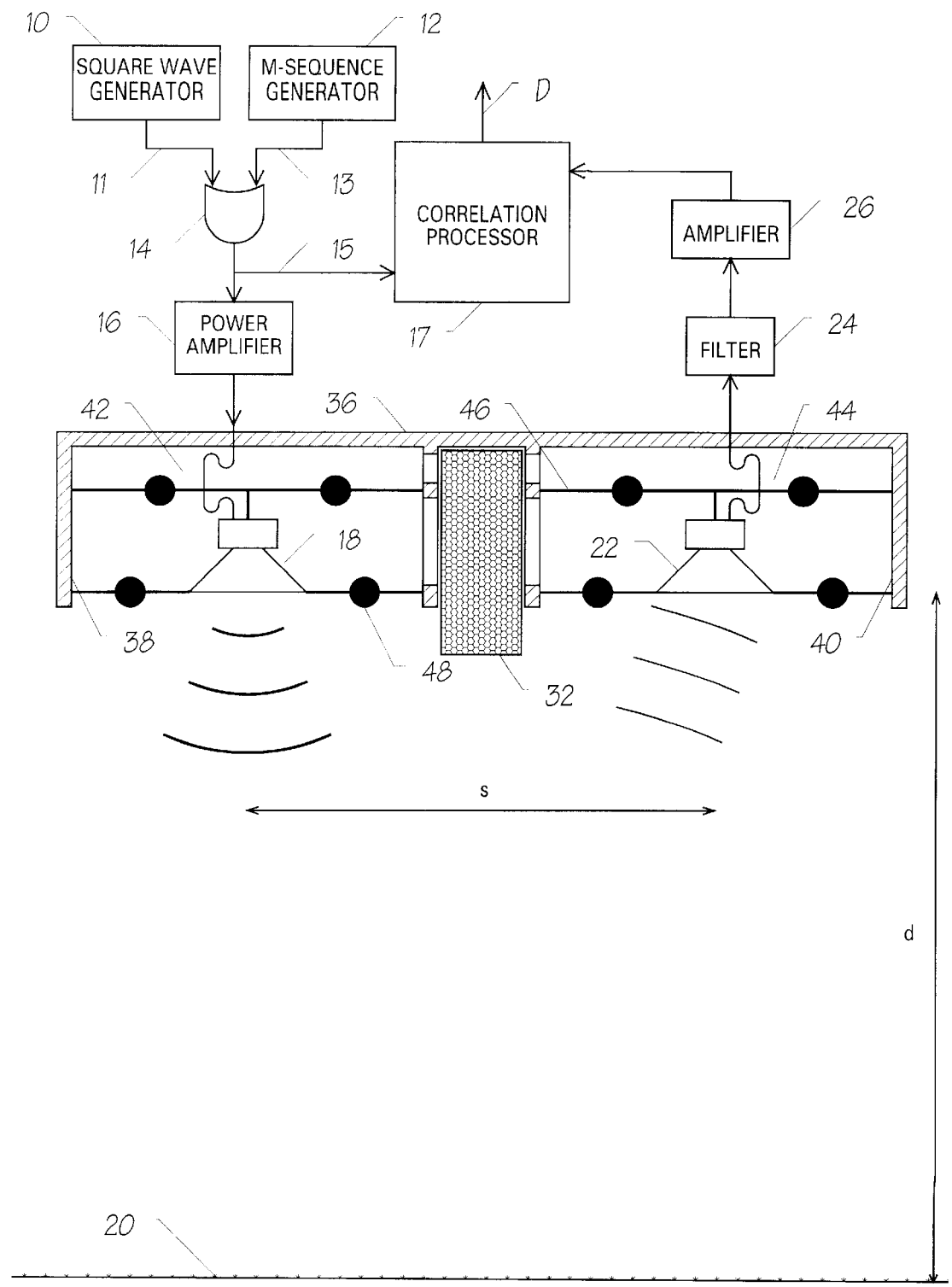
FIG. 1 is a schematic diagram of a distance measurement system.

Referring to FIGS. 1 and 2, the embodiment of the distance measurement system includes a sine wave generator 10, which produces a sine wave signal 11 (shown for simplicity in FIG. 2 as a square wave) having a frequency F, and an M-sequence generator 12, which produces an M-sequence signal 13. The sine wave signal 11 and the M-sequence signal 13 are input to an AND gate 14 which produces a modulated signal 15. The modulated signal 15 is fed both to a power amplifier 16 and a correlation processor 17. (Alternatively, the M-sequence signal 13 itself could be fed to the power amplifier 16 and a correlation processor 17.) The power amplifier 16 supplies the amplified modulated signal to a transmitting transducer 18, for example a Motorola Powerline piezo bullet tweeter, model LO54J, or piezo horn driver, model LO54H, both having a music power rating of 400 W and frequency responses of 1.8 to 20 kHz and 1.8 to 30 kHz, respectively. In use, the sound produced by the transmitting transducer 18 is reflected by a surface 20, and the reflected sound is received by a receiving transducer 22 similar to the transmitting transducer 18. The transmitting and receiving transducers 18,22 are mounted adjacent each other and face generally in the same direction. The signal produced by the receiving transducer 22 is fed to a filter 24, and the filtered signal is fed, via an amplifier 26, to the correlation processor 17. The correlation processor 17 attempts to correlate the modulations of the transmitted and received signals in order to determine a time delay $\tau$ therebetween. It will be appreciated that, if the spacing s between the transmitting and receiving transducers 18,22 is small compared to the distance d between the transducers 18,22 and the surface 20, then the distance d is given by $d=v\tau/2$, where v is the local speed of sound, 340 m/s under normal conditions. Accordingly, the correlation processor 16 can estimate the distance d and produce a corresponding output signal D.

The signal 13 produced by the M-sequence generator 12 contains a series of N-bit words of different values, with the number of words in the series being $2^N-1$, and with the values of the words being arranged in a pseudo-random fashion so as to maximise the possible correlation efficiency. Once the series has been produced, it is then repeated. FIG. 2 shows one of the N-bit words, in this case an 8-bit word, 01101011, in the signal 13. The frequency $F_w$ of generation of the words is synchronised to the frequency F of the sine wave signal 11 such that $F/F_w=BN$, where B is the number of sine wave cycles in a burst representing a particular bit of a particular word. In FIG. 2, B=4. As shown in the lower trace in FIG. 2, the modulated signal 15 is a logical AND of the sine wave signal 11 and the M-sequence signal 13.

FIG. 3A shows the signal pattern of a transmitted sequence, and FIG. 2B shows the signal pattern of the received data. When these two signal patterns are correlated and the delay is converted to distance, a correlation as shown in FIG. 4 is produced. It will be noted that there are two peaks 28,30 in the correlation pattern. The first peak 28 results from the direct transmission of sound from the transmitting transducer 18 to the receiving transducer 22, and the second peak 30 results from sound which is reflected by the surface 20 from the transmitting transducer 18 back to the receiving transducer 22. It is the second peak 13 which is of use in determining the distance d.

It will be noted in FIG. 4 that the direct peak 28 is greater than the reflected peak 30, and the distance d cannot therefore be determined simply from the highest peak. In order to reduce the size of the direct peak 28 relative to the reflected peak 30, the transducers 18,22 could be moved further apart. However, this would undesirably increase the overall size of the transducer assembly. In order to overcome this difficulty, a block 32 of sound absorbing material, such as sound absorbent foam, is placed in the direct path between the transmitting and receiving transducers 18,22. FIGS. 5A and SB are correlation traces without and with, respectively, the block 32 of sound absorbing material. By comparing the two traces, it can be seen that the result of adding the block 32 is to reduce the size of the direct peak 28 and also the background noise, but without reducing the size of the reflected peak 30. Furthermore, the reflected peak 30 is increased in sharpness, and therefore the required information has become clearer and easier to extract from the data. Nevertheless, the inclusion of the block 32 of sound absorbent material may not necessarily be sufficient to reduce the size of the direct peak 28 below the size of the reflected peak 30. However, since the location of the direct peak 28 along the trace is dependent on the spacing between the transmitting and receiving transducers 18,22, which in most cases will be fixed, the data in a region 34 at the beginning of the trace (corresponding to the distance between the two transducers 18,22) can be cancelled, ignored, or a not correlated, so as to produce a correlation trace as shown in FIG. 6. It is now far easier to select the correct information.

As mentioned above, one possible application for the distance measurement system is as a helicopter altimeter. Such an application causes two main complications, noise and vibration. Although a helicopter produces a great amount of vibration, the vibrations are generally of a relatively low frequency and can be easily overcome by filtering of the received signal by the high-pass filter 24 and/or by designing the mounting systems so that the vibrations are not transmitted to the transducers. However, a consequential and unexpectedly strong source of interference is the transmitting transducer which causes serious damage to the received signal. Analyses have shown that any firm connection between the transducers induces so much noise that it may be impossible to identify the reflection peak. To deal with this problem, as shown in FIG. 1, the transducers 18,22 are mounted in a common housing 36 having respective compartments 38,40 for the transducers 18,22, and each of the transducers 18,22 is mounted in its compartment 38,40 by its own mounting arrangement 42,44 which absorbs and damps out the vibrations. Each of these mounting arrangements 42,44 may be provided by elastic bands 46 and weights 48. As also shown in FIG. 1, the sound absorbent block 32 is also mounted in its own compartment between the two compartments 38,40 for the transducers 18,22, with the dividing walls not being rigid or being perforated.

In order to investigate the effect of noise on the distance measurement system, the modulated signal 15 was fed, in an experimental set up, directly to the filter 24 with a predetermined time lag and with a particular amount of white noise added. FIG. 7A is a trace of the obtained correlation against distance with a signal to noise ratio of 1/10, and FIG. 7B is a trace of the obtained correlation against distance with a signal to noise ratio of 1/30. (This signal to noise ratio will subsequently be referred to as the "detection threshold" or "DT".) As can be seen from a comparison of FIGS. 7A and 7B, the addition of noise damages the correlation.

Figure 8:
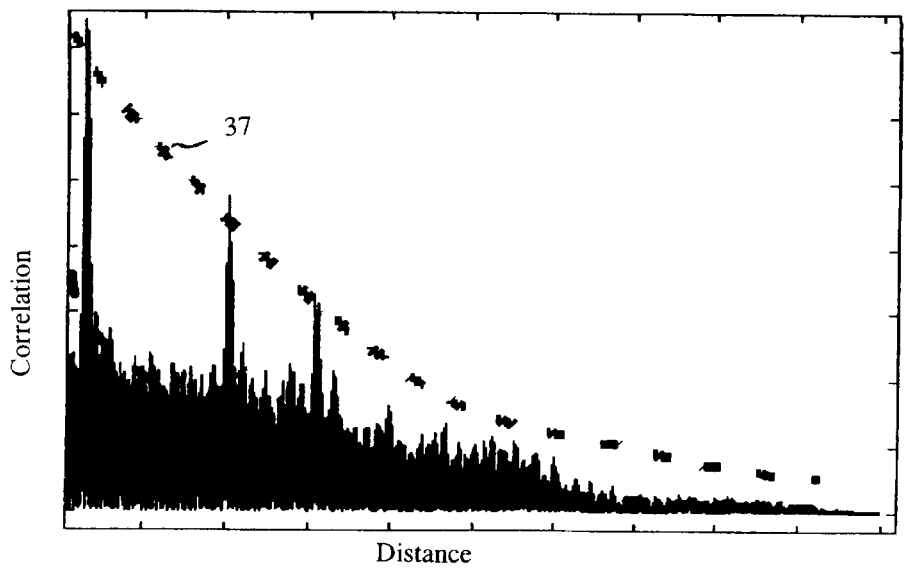
FIG. 8 is a trace of correlation against distance to show the noise and detection envelopes.

FIG. 8 shows three correlation traces overlaid on each other for three different time lags corresponding to three different distances, and an envelope for the correlation peaks has been drawn in, referenced 37. As might reasonably be expected, the envelope 37 for the correlation peaks has a generally exponential decay with distance, and it might be presumed that this would seriously limit the range of detection. However, it can also be seen that the envelope for the noise contribution also decays generally exponentially with distance, and therefore the effect of noise on the range of detection is less serious than might first be expected.

Figure 9:
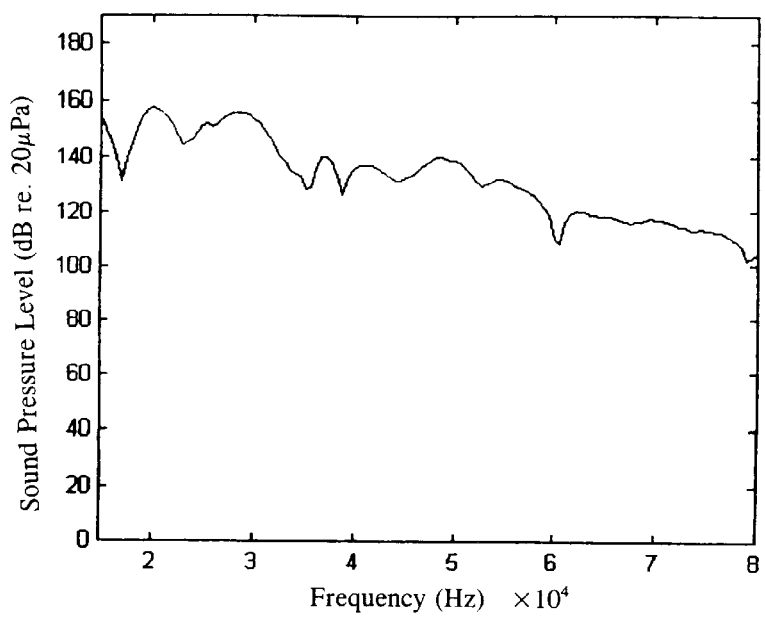
FIG. 9 is a trace of sound pressure level against frequency for the transducers of FIG. 1.

In order to assess the sensitivity of the transmitting and receiving transducers 18,22, one of the transducers was supplied, in an experimental set up, with a low-frequency square wave after having been filtered by a 16 kHz high pass filter, and the sound pressure level ("SPL") produced was measured by a test microphone spaced one metre from the transducer. A fast Fourier transform was performed on the signal from the test microphone, and knowing the calibration, the SPL delivered by the transducer, in dB re. 20 $\mu$Pa, was plotted against frequency, as shown in FIG. 9. As can be seen, there is a fundamental resonance at about 20 kHz, and higher order resonances at about 29, 37, 41 and 49 kHz.

Although the directivity index ("DI") of a transducer is generally thought of as a complex pattern, for the purposes of the present invention only a small amount of information is required. As will be described below, the DI is used in the sonar equation to modify the noise level and hence to allow for the direction of arrival of noise being at an angle of reduced sensitivity of the transducer and consequently being reduced in its effect. The value for the sonar equation is therefore that at the angle at which the noise arrives. With the transducers being located just below the helicopter, the angle can be easily determined, and in the following discussion a directivity index at 90°±5° will be considered. The DI for one a particular angle θ is given by:

$$DI=[SPL \text{ at } 0°]-[SPL \text{ at } \theta°]$$

Figure 10:
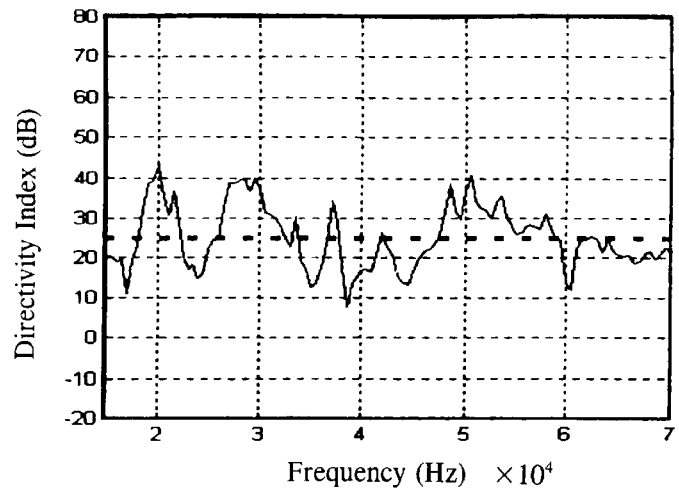
FIG. 10 is a trace of directivity index against frequency for the transducers of FIG. 1.

FIG. 10 is a trace of DI at θ=90° against frequency over the range 10 to 70 kHz. As will be seen, the DI varies between about 10 dB and 40 dB and has an average value of about 25 dB.

In order to assess the effect of noise on the distance measurement system in its application as a helicopter altimeter, the actual noise made just beneath a small helicopter was recorded, and the power spectral density ("PSD") was determined as a function of frequency. The sonar equation to be described below requires a noise level ("NL") for a particular bandwidth ("BW"), expressed in dB re. 20 $\mu$Pa, which is given by:

$$NL=20\ \log_{10}((10^{(PSD/20)}.BW)/(20.10^6)).$$

Figure 11:
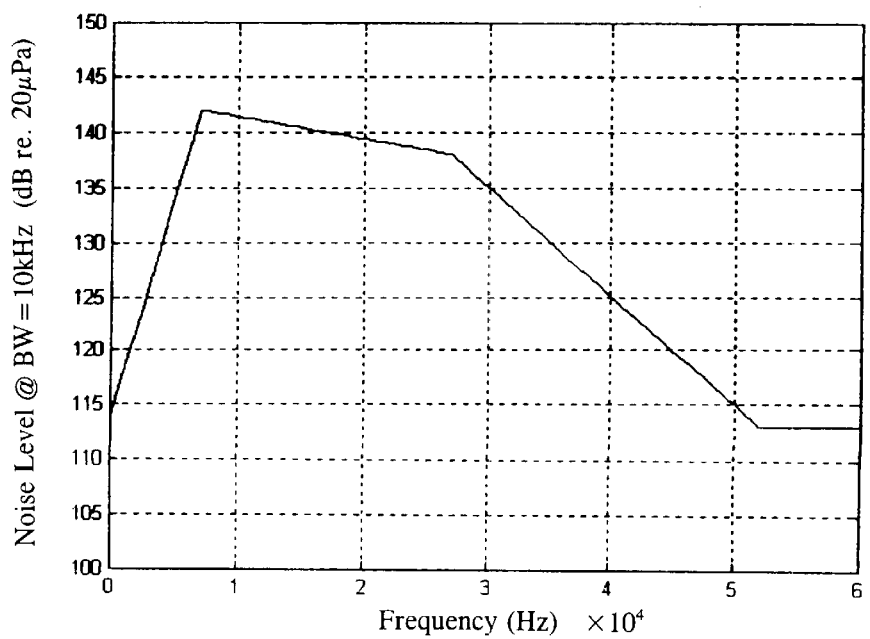
FIG. 11 is a trace of noise level against frequency obtained from a recording of noise beneath a small helicopter.

It can be shown that for a typical M-sequence period of 0.15 ms, a fairly narrow bandwidth of 10 kHz produces an acceptable accuracy of 50 mm. Using this bandwidth of 10 kHz, the NL obtained from the power spectral density measurements was plotted against frequency and is shown in FIG. 11. As can be seen, lower frequencies are much more noisy than higher frequencies.

The acoustic signal between the transmitting and receiving transducers 18,22 suffers two main losses, a transmission loss ("TL") through the air, and a reflection loss ("R") at the air/ground interface 20. The transmission loss is given, in the simplest case, by:

$$TL=20\ \log_{10}((1/(2d))$$

where d is the altitude of the helicopter, as described above.

Figure 12:
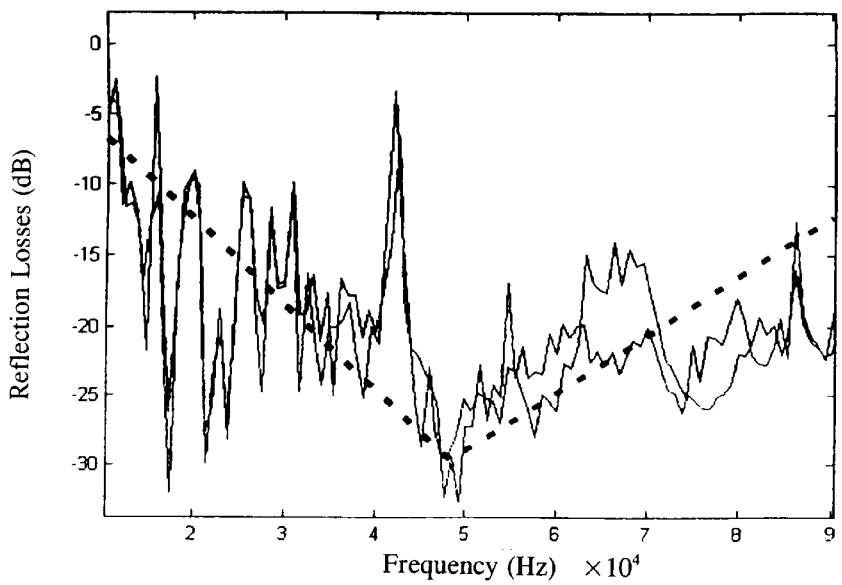
FIG. 12 are traces of acoustic reflection loss against frequency at an air/grassland interface.

Various measurements of reflection loss have been made in the past in respect of ground surfaces, such as grass, soil, forest floor and stony ground surfaces, but at frequencies extending only up to 10 kHz. All of these prior assessments have been concerned with the propagation and control of community noise, with the result that the tests have been restricted to audio frequencies. In order to assess the reflection loss at higher frequencies, in an experimental set up, pulses were emitted by a transducer spaced a predetermined distance above a test surface and directed to the surface, and a test microphone was placed far closer to the test surface to pick up the direct pulse and the reflected pulse. A fast Fourier transform was performed on each pulse, and the reflection loss was calculated from the transfer functions. FIG. 12 shows the results for two tests in the case of reflection at grassland surfaces at two different locations, and it can be seen that the shapes of the two traces are roughly the same. An average reflection loss has been marked on FIG. 12 as a dashed line, and it can be seen that the reflection loss has a minimum at about 49 kHz.

As mentioned above, the detection threshold ("DT") is the ratio between the signal returning from a surface and the background noise level, at which an altitude estimation can be made. The detection threshold depends exclusively on the method of processing, and is the only factor which can be fully controlled. The main parameters leading to a maximum evaluation are: (a) the sampling frequency by the correlation processor 17 should be no less than the signal frequency F (in the tests described in this specification a sampling frequency of 50 kHz was used); (b) the M-sequence should be as complex as possible to allow a high rate of identification; and (c) the received signal should be band pass filtered in order to keep only the effective information. A computational investigation has shown that a detection threshold of 30 dB is easily achievable.

The sonar equation which has been referred to above is the equation governing the altimeter range, and is defined as:

$$SL-(NL-DI)+R+TL+DT\geq 0$$

where the parameters are as described above. Given that $TL=20\ \log_{10}((1/(2d))$ is described above, it follows that the maximum range $d_{max}$ of the altimeter is:

$$d_{max}=\tfrac{1}{2}.10^{(SL-(NL-DI)+R+DT)/20}$$

The parameters SL, NL and DI as a function of frequency have been ascertained and described above, and are shown together in FIG. 13A. The parameter R cannot be anticipated, but a worst case value of −40 dB will be considered. The parameter DT can be fixed at a reasonable value of 30 dB. These latter two parameters are shown together in FIG. 13B.

Figure 13A:
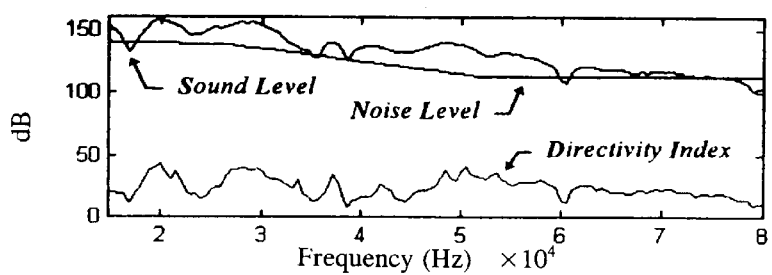
FIG. 13A is a combined trace of sound pressure level, noise level and directivity index against frequency.
Figure 13B:
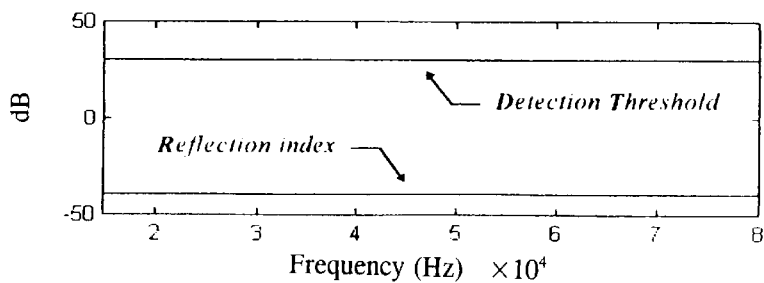
FIG. 13B is a combined trace of an estimated worst-case acoustic reflection loss and a detection threshold against frequency.
Figure 14:
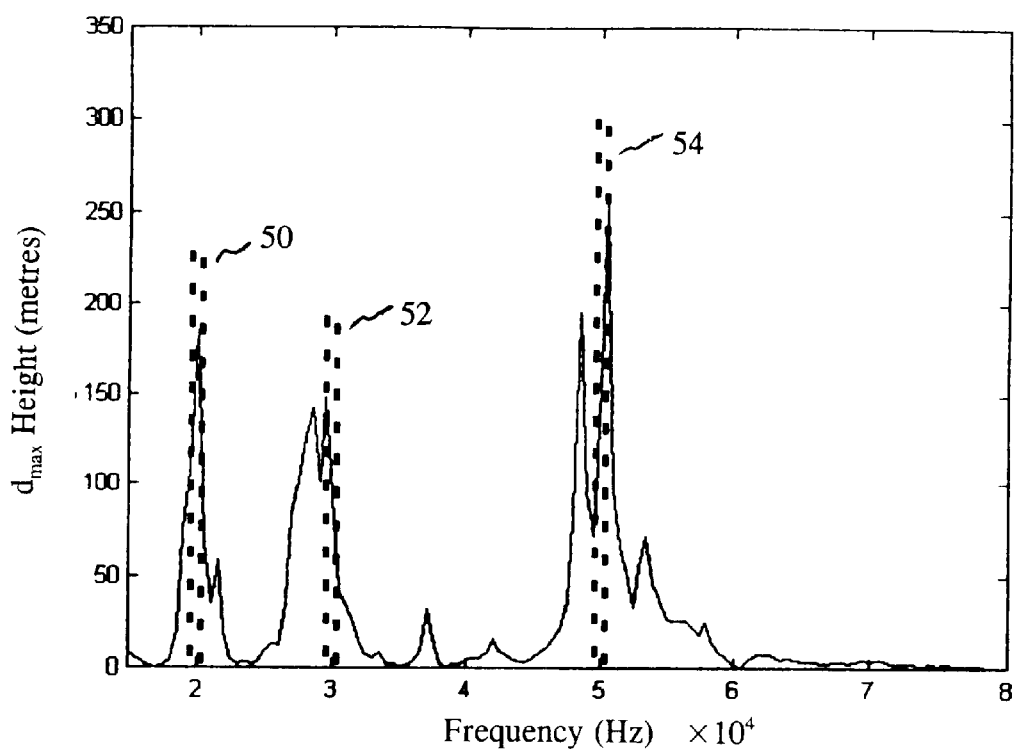
FIG. 14 is a trace of estimated detection range against frequency for the distance measurement system of FIG. 1, produced from the traces of FIGS. 13A and 13B.

By using the values for the parameters as shown in FIGS. 13A and 13B in the equation for $d_{max}$ given above, a graph of $d_{max}$ against frequency has been produced and is shown in FIG. 14. As can be seen, there are three distinct peak regions 50,52,54. The first peak 50 is located at a frequency of about 20 kHz and corresponds to the fundamental resonant frequency of the transducers 18,22, where the sound pressure is at a maximum. The next peak 52 is located at a frequency of about 30 kHz, which corresponds to a higher order resonant frequency of the transducers 18,22 and where the noise level is lower. The highest peak 54 is at a frequency of about 50 kHz, and corresponds to another higher order resonant frequency of the transducers 18,22, at which there is relatively little noise, at which the reflection loss at the surface 20 is relatively low, and at which the directivity index of the transducers is relatively high.

In its application as a helicopter altimeter, the assembly containing the transducers 18,22 of the distance measurement system described above may be mounted on the helicopter body, with the transducers 18,22 directed downwardly, and the output signal D from the correlation processor 17 may be used to provide an altitude display to the pilot of the helicopter. Alternatively or additionally, the output signal D may be linked in to the control system of the helicopter and used automatically to control the lift produced by the helicopter so as to maintain the altitude of the helicopter, or to vary it, for example in accordance with a pre-programmed altitude profile. Alternatively, the assembly containing the transducers 18,22 may be mounted on a winch hook or the like of the helicopter, or on a load carried by the winch hook, and the output signal D from the correlation processor 17 may be used to provide an altitude display to the winch operator and/or pilot. Alternatively or additionally, the output signal D may be linked in to the control system of the helicopter, as described above, and/or linked in to a control system for the winch so as to maintain the height of the load on the winch above the ground or sea, or to vary it, for example in accordance with a pre-programmed load dropping profile, for example to provide soft-landings.

It should be noted that the embodiment of the invention has been described above purely by way of example and that many modifications and developments may be made to the invention.

For example, the transducers could be arranged to face generally horizontally so as to provide obstacle ranging.

Also, one of the transducers, such as the transmitting transducer 18, could be mounted on the helicopter, and the other transducer 22 could be mounted on the winch hook or load. There will therefore be a direct acoustic transmission from the transmitting transducer 18 to the receiving transducer 22, and an indirect acoustic transmission from the transmitting transducer 18 to the receiving transducer 22 via a reflection at the surface 20. As in the embodiment described above, the transmission electrical signal can be correlated with the reception electrical signal, and this will produce two correlation peaks, the delay for the first peak being equal to the distance between the transmitting transducer 18 and the receiving transducer 22 divided by the speed of sound, and the period between the two peaks being equal to twice the distance between the receiving transducer 22 and the reflection surface 20 divided by the speed of sound. Alternatively or additionally, the reception electrical signal can be correlated with itself, and this will produce a correlation peak whose delay is equal to twice the distance between the receiving transducer 22 and the reflection surface 20 divided by the speed of sound.

Also, it is not necessary to provide a transducer to transmit an M sequence in all applications, since it is possible to make use of the correlating properties of the noise generated by the helicopter or other aircraft to measure height. The noise generated by flow of air over a fuselage, by the tips of a helicopter rotor, by the motor that drives the aircraft, and by other aerodynamic and other sources of sound, can be correlated to fmd the height of the aircraft. The aircraft generates noise, some of which may be received directly by a transducer positioned on the aircraft, and some of which will propagate down to the ground and will be reflected from the ground, arriving back at the aircraft. The noise that is received by a transducer on the aircraft is therefore a composite of the direct and reflected noise. If an autocorrelation is performed on the noise, it will yield a peak corresponding to the autocorrelation of the directly received noise, and a peak corresponding to the crosscorrelation of the direct noise with the reflected noise. This latter peak will be delayed in the correlation domain by an amount corresponding to the difference on arrival time of the direct and reflected noise, which is simply related to the height of the aircraft. Instead of correlation, cepstral analysis may also be used to determine the time delay of the reflection.

What I claim is:

1. A distance measuring system, comprising:

means for generating a first modulated electrical signal;

a transmitting transducer for receiving the first electrical signal and producing a corresponding modulated acoustic signal to be directed towards and reflected by a surface;

a receiving transducer arranged to receive the reflected acoustic signal and for producing a corresponding second modulated electrical signal; and processing means for receiving at least the second electrical signal and correlating the modulations thereof to produce an indication of a time delay thereof from which a distance travelled by the acoustic signal can be determined;

wherein the frequency of the acoustic signal is chosen so that it is not at or near the fundamental resonant frequency of either transducer and so that it satisfies at least one of the following conditions:

at or near a higher-order resonant frequency of one or both of the transducers;

at a frequency at which a frequency-dependent directivity index of the transducers is relatively high;

at a frequency at which the ambient acoustic noise level is relatively low; and at a frequency at which the acoustic reflection loss at the surface is relatively low.

2. A helicopter having a distance measuring system for use as an altimeter or for obstacle detection, the distance measuring system comprising:

means for generating a first modulated electrical signal;

a transmitting transducer for receiving the first electrical signal and producing a corresponding modulated acoustic signal to be directed towards and reflected by a surface;

a receiving transducer arranged to receive the reflected acoustic signal and for producing a corresponding second modulated electrical signal; and processing means for receiving at least the second electrical signal and correlating the modulations thereof to produce an indication of a time delay thereof from which a distance travelled by the acoustic signal can be determined;

wherein the frequency of the acoustic signal is chosen so that it is not at or near the fundamental resonant frequency of either transducer and so that it satisfies at least one of the following conditions:

at or near a higher-order resonant frequency of one or both of the transducers;

at a frequency at which a frequency-dependent directivity index of the transducers is relatively high;

at a frequency at which the ambient acoustic noise level is relatively low; and at a frequency at which the acoustic reflection loss at the surface is relatively low; and wherein the frequency of the acoustic signal is chosen so that it satisfies at least one of the following conditions:

at a frequency at which the acoustic noise level produced by the helicopter below the helicopter is relatively low; and at a frequency at which the acoustic reflection loss at an interface between air and grassland, rock or water is relatively low.

3. A helicopter as claimed in claim 2, wherein at least one of the transducers is stationarily mounted with respect to the body of the aircraft.

4. A helicopter as claimed in claim 2, wherein at least one of the transducers is stationarily mounted with respect to a winch-hook, or the like, of the helicopter.

* * * * *